3,083,219
INTERCONDENSATION OF TETRAHYDROFURAN
WITH ORGANOHALOSILANES
Robert P. Anderson, Scotia, N.Y., assignor to General
Electric Company, a corporation of New York
No Drawing. Filed Mar. 15, 1961, Ser. No. 95,791
7 Claims. (Cl. 260—448.8)

This invention is concerned with a process for effecting intercondensation of a tetrahydrofuran compound with an organosilane and products derived therefrom. More particularly, the invention relates to a process for effecting intercondensation of a tetrahydrofuran compound with an organosilane which comprises reacting the tetrahydrofuran compound with an organohalogenosilane (or mixtures of such silanes) having the formula I  $R_mSiX_{4-m}$ in the presence of magnesium and an iodide catalyst, where R is a monovalent hydrocarbon radical selected from the class consisting of alkyl, aryl, alkaryl, aralkyl, and cycloalkyl radicals, X is a halogen and $m$ is a whole number equal to from 2 to 3, inclusive. The invention also embraces certain products derived from said process.

Intercondensation products of tetrahydrofuran and organosilanes have been prepared in the past by highly complex procedures. Products thus obtained are useful as intermediates in the preparation of other organic compounds such as monohydroxy and dihydroxy-containing compounds which can be esterified to make plasticizers or polymer compositions. Some of the processes for interacting the tetrahydrofuran with organosilanes require extremely high temperatures, for instance, generally in the region of about 200° C., as is shown in an article by Knoth et al. in J. Am. Chem. Soc., 80, 4106 (1958). Kratochvil et al. in Chem. listy, 52, 151–2 (1958) have shown the cleavage of tetrahydrofuran at reflux temperatures with silicon tetrachloride and a small amount of HCl, but yields are poor. H. Normant in Compt. rend. 239, 1510 (1954), states that at around 200° C. the tetrahydrofuran ring can be cleaved in a tetrahydrofuran-Grignard complex. It is also reported in U.S. Patent 2,534,149 that at 250° C. tetrahydrofuran and dimethyldichlorosilane react to give 1,4-dichlorobutane and a dimethylpolysiloxane.

Unexpectedly, I have discovered that I am able to effect intercondensation between certain organosilanes and a tetrahydrofuran compound to give both cyclic and linear derivatives derived from the tetrahydrofuran molecule. In accordance with my invention, a tetrahydrofuran compound is reacted with an organohydrolyzable silane of the Formula I (hereinafter referred to as "organosilane"), employing magnesium and an iodide catalyst in the reaction mixture. By means of these particular conditions and reactants, I am able to accomplish the intercondensation of the organosilane and the tetrahydrofuran compound at temperatures materially lower than have heretofore been possible when employing tetrahydrofuran and organosilanes of the same character employed by me. Thus, I am able to effect such intercondensation at temperatures as low as 40° C., although higher temperatures may be undoubtedly used. By means of my process, I am also able to obtain certain novel compositions, particularly 2,2-diphenyl-1-oxa-2-silacyclohexane having the formula

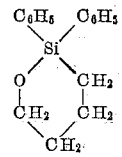

3-buteneoxytrimethylsilane having the formula

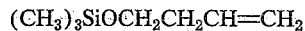 $(CH_3)_3SiOCH_2CH_2CH=CH_2$ and 2,2,8,8-tetramethyl-3-oxa-2,8-disilanonane having the formula

 $(CH_3)_3SiOCH_2CH_2CH_2CH_2Si(CH_3)_3$

It was entirely unexpected and in no way could have been predicted that operating under the above conditions, I could effect intercondensation with the tetrahydrofuran molecule and to obtain the products described above. Thus, it would have been expected that this reaction would proceed in the presence of any Lewis acid and a chlorosilane. However, this was found not to be the case since no product could be isolated from the reaction of anhydrous magnesium iodide, dimethyldichlorosilane, and tetrahydrofuran. Furthermore, the unpredictability of the process is evidenced by the fact that when employing conditions whereby tetrahydropyran (a compound analagous to tetrahydrofuran) was reacted with anhydrous zinc chloride and dimethyldichlorosilane at reflux conditions, there was no cleavage of the tetrahydropyran nucleus. Finally it was found that organosilanes containing silicon-bonded alkoxy radicals, instead of silicon-bonded halogens, failed to give any detectable yield of desired product.

Among the radicals which R in Formula I can be are, for instance, alkyl radicals (e.g., methyl, ethyl, propyl, isopropyl, butyl, amyl, isoamyl, hexyl, 2-ethylhexyl, decyl, etc.); aryl radicals (e.g., phenyl, naphthyl, diphenyl, etc.); cycloalkyl radicals (e.g., cyclohexyl, cyclopentyl, etc.); aralkyl radicals (e.g., benzyl, phenylethyl, etc.); alkaryl radicals (e.g., tolyl, xylyl, ethylphenyl, etc.); cycloalkyl radicals (e.g., cyclopentyl, cyclohexyl, etc.). X may be any halogen, for instance, chlorine, bromine, iodine, etc.

Typical examples of organosilanes which may be employed are, for instance, dimethyldichlorosilane, trimethylchlorosilane, diphenyldichlorosilane, triphenylchlorosilane, methyl phenyldichlorosilane, dimethyl phenylbromosilane, trimethyliodosilane, diethyldifluorosilane, di-(cyclohexyl)dibromosilane, methyl benzyldichlorosilane, di-(tolyl)dichlorosilane, dimethyldiiodosilane, etc.

The above reaction requires iodine or a source of iodine as a catalyst. The term "iodide catalyst" is intended to mean either elemental iodine or any compound of iodine which under the condition of the reaction and in the presence of any of the reactants yields iodine, magnesium iodide or other iodine compounds or complexes, e.g. complexes with the tetrahydrofuran compound. It is believed that the iodine does not act merely as an activator for the magnesium for the reason that other conventional activators for magnesium, such as bromine, alkyl halides, other than alkyl iodides, etc., have a negligible effect on causing cleavage of the tetrahydrofuran compound.

The term "tetrahydrofuran compound" is intended to include not only tetrahydrofuran itself, but also substituted derivatives of tetrahydrofuran in which the substituents on the tetrahydrofuran nucleus are hydrocarbon radicals selected from the class consisting of alkyl, aryl, aralkyl, alkaryl and cycloalkyl radicals. In order to insure that the tetrahydrofuran molecule can be most readily cleaved under the conditions of my reaction, it is desirable that at least one carbon adjacent the oxygen atom contain two hydrogen atoms and be free of any other substitution. These tetrahydrofuran compositions may be illustrated by the general formula

II

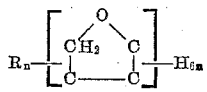

where $n$ is a whole number equal to from 0 to 6 and R has the same meaning as given above.

Among the tetrahydrofuran compounds, including tetrahydrofuran, which can be employed in the practice of the present invention may be mentioned, for example, 2-methyl tetrahydrofuran, 2,2-dimethyl tetrahydrofuran, 3-methyl tetrahydrofuran, 3-butyl tetrahydrofuran, 2-benzyl tetrahydrofuran, 2-pentyl tetrahydrofuran, 2-propyl tetrahydrofuran, 3-propyl tetrahydrofuran, 3-(4-methylpentyl) tetrahydrofuran, 2-(3-phenylpropyl) tetrahydrofuran, etc. Other compounds coming within the scope of Formula II may be found in the book "The Furans," by Dunlop and Peters, published by Reinhold Publishing Co., New York, N.Y. (1953).

The proportions of the organosilane and the tetrahydrofuran compound may be varied widely. Generally, I prefer to employ the tetrahydrofuran compound in a molar excess over the molar concentration of the organosilane. Advantageously I have found that, on a weight basis, I can employ from about 1.5 to 20 or more parts of the tetrahydrofuran compound per part of the organosilane. Amounts of the tetrahydrofuran composition in excess of the above ratio will ordinarily produce no additional advantage.

The amount of magnesium used in carrying out my process may also be varied widely. I have found that for most reactions, optimum amounts of the magnesium may range from 0.5 mole of the magnesium, up to as much as 3 to 5 moles of the magnesium, per mole of the organosilane. On a weight basis, I may use from 0.05 to about 2 parts magnesium per part of the organosilane.

The iodide catalyst (hereinafter so used generically) is used in exceedingly small amounts and usually requires only a pinch of a few crystals of the iodide material, for instance, ethyl iodide, n-propyl iodide, tertiary butyl iodide, isopropyl iodide, n-butyl iodide, metallic iodides, e.g., zinc iodide, magnesium iodide, etc.; or iodine itself. Under some conditions, combinations of an alkyl iodide and crystalline iodine are advantageously employed. When employing organosilanes containing silicon-bonded iodine, this iodine can be used as at least part of the iodide catalyst source. Trace amounts of the iodide catalyst up to about 2 percent, by weight, of the latter, based on the total weight of the reaction mixture of the organosilane, tetrahydrofuran compound, and magnesium may advantageously be employed, it being understood that larger amounts of the iodide catalyst may also be used. Generally, the amount of iodide catalyst used is that ordinarily employed in Grignard reactions.

In general, in carrying out my process, it is only necessary to mix the tetrahydrofuran compound, the organosilane, and magnesium and thereafter add the iodide catalyst. The reaction is initiated spontaneously upon addition of the iodide catalyst and generally requires no external heating. Once the reaction has been initiated, temperatures as high as 60 to 80° C. are obtained without any external heating, although under certain conditions, heat is not precluded, when it is desired to hasten the reaction. Advantageously it may be desirable under some conditions to maintain the temperature at a lower level by means of a cooling bath in order to exercise better control of the reaction. Throughout the reaction, adequate stirring conditions should be maintained and as is usual in Grignard reactions, anhydrous conditions should be maintained in order to insure that no undue hydrolysis will take place, either of the reactants or of the reaction product.

Generally, it is desirable to effect the reaction by first flushing the magnesium with nitrogen, adding some of the tetrahydrofuran compound, and thereafter adding the organosilane in an additional amount of the tetrahydrofuran compound with vigorous stirring. The iodide catalyst can be added before or after the organosilane is added to the magnesium. Times of reaction varying from 20 minutes to several hours may be employed. Once the initial exothermic reaction has subsided, it may be desirable in some conditions to effect reflux of the mixture to insure that the reaction has gone to completion. Thereafter, the reaction product is advantageously separated from any deposited magnesium salts, and the reaction product isolated by either distillation or else by adding a non-solvent to the reaction mixture to effect deposition of the desired product.

In order that those skilled in the art may better understand how the present invention may be practiced, the following examples are given by way of illustration and not by way of limitation.

*Example 1*

A large 3-neck flask fitted with a stirrer, dropping funnel, thermometer and condenser, and containing 15 grams (0.62 mole) magnesium was heated and flushed with nitrogen. To the flask was then added a 300 ml. cooled mixture of tetrahydrofuran and 75 grams (0.52 mole) dimethyldichlorosilane. The reaction was initiated with 1 ml. ethyl iodide and a small crystal of iodine. Once the reaction started, it proceeded readily at a temperature of 60° to 65° C. without external heating for about 1.5 hours. The resulting reaction mixture was diluted with 150 ml. dried benzene, filtered under nitrogen to remove magnesium salts, and then stripped of solvent. The resulting liquid was again filtered and fractionally distilled to give about 36 grams (about a 56 percent yield) of 2,2-dimethyl-1-oxa-2-silacyclohexane whose index of refraction was $n_D^{20}$ 1.4290–1.4310. Analysis of this compound established it to be the above cyclic compound as evidenced by the fact that it contained 54.8 percent carbon and 10.8 percent hydrogen; theoretical 55.4 percent carbon and 10.8 percent hydrogen. This silacyclohexane was readily converted by hydrolysis to 5,5,7,7-tetramethyl-6-oxa-5,7-disila-1,11-undecanediol in the manner reported by Knoth et al., J. Am. Chem. Soc., 80, 4106 (1958). Additional yields of the desired product could be obtained by heating the residue.

When the conditions of Example 1 were repeated, but this time employing diethyl ether in place of tetrahydrofuran, it was found that the reaction was very slow and much larger amounts of iodine were needed to catalyze the reaction. Under such conditions, only 33 percent of the theoretical amount of magnesium reacted after 30 hours. No products were recovered except for small amounts of a disilane and a high boiling liquid. The substitution of bromine in place of iodine in the reaction of Example 1 resulted in a consumption of only 18 percent of the required magnesium after 24 hours, and no 2,2-dimethyl-1-oxa-2-silacyclohexane could be recovered from the reaction product.

*Example 2*

Employing the same apparatus and procedure as in Example 1, 15 grams (0.62 mole) magnesium was reacted with 55 grams (0.51 mole) trimethylchlorosilane and 300 ml. tetrahydrofuran. The reaction was initiated with 2 ml. ethyl iodide and with slight heating. The reaction was only slightly exothermic and was, therefore, heated at reflux for about 15 hours. This reaction mixture was diluted with 150 ml. of pentane and filtered to remove the magnesium salts. The filtrate was stripped of solvent, filtered again and then fractionally distilled. Two products were recovered having the generic formula $(CH_3)_3Si—O—CH_2CH_2Z$ where Z is either the $—CH=CH_2$ radical or the $—CH_2CH_2Si(CH_3)_3$ radical. One product, 3-butenoxytrimethylsilane, was recovered in a yield of about 16.61 grams (23.1 percent of theoretical) and was found to have a boiling point of 118–118.5° C. at atmospheric pressure (58.5–59.5° C./75 mm.), and an index of refraction of $n_D^{20}$ 1.3691. Analysis of this compound showed that it contained 57.4 percent carbon and 12.1 percent hydrogen; theoretical 58.4 percent carbon and 11.1 percent hydrogen. There was also obtained about 23 grams (about 32 percent of theoretical) of the composition 2,2,8,8-tetramethyl-3-oxa-2,8-disilanonane of the formula $(CH_3)_3SiO(CH_2)_4Si(CH_3)_3$, having a boiling point of 134° C./78 mm. and an index of refraction of $n_D^{20}$ 1.4181. Analysis showed the compound to contain 53.5 percent carbon and 12.3 percent hydrogen; theoretical 55.0 percent carbon and 11.9 percent hydrogen. Both of the above compounds were extremely hygroscopic.

*Example 3*

Employing the same equipment as was used in Example 1, 15 grams of magnesium were reacted with 63 grams of diphenyldichlorosilane in 300 ml. of tetrahydrofuran. The reaction was initiated with 1 gram iodine. The temperature rose from 66 to 70° C. The reaction mixture was heated at its reflux temperature for a period of about 24 hours. The viscous reaction mixture thus obtained was worked up and the product isolated, similarly as done in Example 1, to give 36.3 grams (57 percent of theoretical) liquid 2,2-diphenyl-1-oxa-2-silacyclohexane boiling at 215–216° C./34–38 mm. and having a refractive index $n_D^{20}$ 1.5722. Evidence that the above-identified compound had been obtained was substantiated by the fact that it was found to contain 75.43 percent carbon, 7.34 percent hydrogen, and 10.7 percent silicon; theoretical 75.76 percent carbon, 7.39 percent hydrogen, and 11.0 percent silicon.

*Example 4*

This example illustrates a method for using the composition obtained in Example 3 above. More particularly, 2,2-diphenyl-1-oxa - 2 - silacyclohexane is mixed with an equal molar concentration of water and stirred. An exothermic reaction occurs; the addition of a few drops of hydrochloric acid insures completion of the hydrolysis reaction. Distillation of the reaction product yields the diol compound having the formula

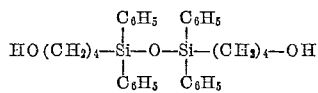

This composition can be used as an additive for reducing the structure in silicone gums containing structure-inducing fillers, such as silica areogel, fume silica, etc., in the same manner as is accomplished by the organosilicon compositions used for similar purposes as described in U.S. Patent 2,954,357, issued September 27, 1960, and in U.S. Patent 2,890,188, issued June 9, 1959.

In addition to employing the diol described above for the purposes recited, the diol can also be used to make polyester resins. Thus, the diol compound can be reacted with terephthalic acid or phthalic acid or anhydride to form polyester resins, in the first case to form terephthalate polymer compositions used in making fibers; and when the diol is reacted with phthalic acid or anhydride, one obtains alkyd resins which are useful in the coating, insulating and protective arts. Modification of the phthalic acid reaction product with oils further increases the versatility of the products as air-drying coating compositions.

The 3-butenoxytrimethylsilane is also useful as an intermediate in making the hydroxy derivative thereof having the formula $HO(CH_2)_4OSi(CH_3)_3$, which can be used as an esterifying and chain-stopping material with organic mono- and dicarboxylic acids in polyester reactions.

The 3-butenoxytrimethylsilane can be polymerized to give useful polymers. Thus, 3-butenoxytrimethylsilane can be heated at a temperature of about 75° C. to 100° C. in the presence of small amounts of aluminum triethyl and titanium trichloride (or titanium tetrachloride) employing the well known Ziegler type catalyst, for a time ranging from a few minutes to several hours. The solid polymer thus obtained can be hydrolyzed to give adhesives and coating compositions for various surfaces, such as protective or decorative. Alternatively, the 3-butenoxy-trimethylsilane can be hydrolyzed to give trimethylsilanol which can be used as an additive for reducing structure in silicone gums containing structure-inducing fillers as mentioned above. The 4-hydroxybutene-1 obtained (in addition to the trimethylsilanol) can be used as a chain stopper in polyester formation and, in turn, can be reacted with long chain aliphatic carboxylic acids, such as 2-ethylhexanoic acid, adipic acid, etc., to form plasticizers for various resins, including polyvinyl halide resins, such as polyvinyl chloride.

The 2,2,8,8-tetramethyl-3-oxa-2,8-disilanonane can also be hydrolyzed by treating with water in the presence of acid to give a silicon-containing aliphatic alcohol having the formula $(CH_3)_3Si(CH_2)_4OH$. This alcohol can be reacted with adipic acid employing 2 moles of the alcohol per mole adipic acid to form long chain plasticizers of the formula

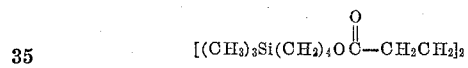

which again are useful for plasticizing vinyl halide resins, such as polyvinyl chloride, polyvinylidene chloride, etc. The presence of the silicon in the plasticizer molecule tends to increase the heat resistance of the plasticizer. Such vinyl halide resins containing the additive plasticizers can be used as insulation for electrical conductors to form insulated conductors having good electrical properties as well as good moisture resistance.

It will, of course, be apparent to those skilled in the art that instead of employing the particular organosilane and the tetrahydrofuran compound recited above, other organosilanes and other tetrahydrofuran compositions substituted in various positions in the furan nucleus can also be employed. The proportions of the ingredients can be varied widely as can the conditions under which the reaction is carried out. Products obtained in accordance with my process can be hydrolyzed and then crosslinked with organic isocyanates. Alternatively such products can be converted to organosilicon compositions similar to those described in French Patent 1,228,514 to make additives useful in making polyurethane foams.

What I claim as new and desire to secure by Letters Patent of the United States is:

1. The process for effecting intercondensation of a tetrahydrofuran compound with an organosilane which comprises reacting tetrahydrofuran with an organosilane having the formula

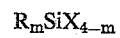

in the presence of magnesium and an iodide catalyst, where R is a monovalent hydrocarbon selected from the class consisting of alkyl, aryl, aralkyl, alkaryl, and cycloalkyl radicals, X is a halogen, and m is a whole number equal to from 2 to 3, inclusive.

2. The process for effecting intercondensation of tetrahydrofuran with dimethyldichlorosilane which comprises reacting tetrahydrofuran with dimethyldichlorosilane in the presence of magnesium and an iodide catalyst.

3. The process as in claim 2 in which the iodide catalyst is a mixture of ethyl iodide and iodine.

4. The process for effecting intercondensation of tetrahydrofuran with trimethylchlorosilane which comprises reacting tetrahydrofuran with trimethylchlorosilane in the presence of magnesium and an iodide catalyst.

5. The process as in claim 4 in which the iodide catalyst is ethyl iodide.

6. The process for effecting intercondensation of tetrahydrofuran with diphenyldichlorosilane which comprises reacting these two ingredients in the presence of magnesium and an iodide catalyst.

7. The process as in claim 6 in which the iodide catalyst is iodine.

References Cited in the file of this patent

UNITED STATES PATENTS

| | | |
|---|---|---|
| 2,396,692 | Garner | Mar. 18, 1946 |
| 2,924,588 | Speier | Feb. 9, 1960 |
| 2,983,744 | Knoth | May 9, 1961 |

OTHER REFERENCES

Speier, "Jour. Am. Chem. Soc.," vol. 74 (1952), pp. 1003–10.

Knoth et al., ibid, vol. 80 (1958), pp. 4106–8.

Anderson et al., WADC Techn. Report 59–61 (1959), p. 47.

Steudel et al., ibid, vol. 82 (Dec. 5, 1960), pp. 6129–32.